(12) United States Patent
Blaschke et al.

(10) Patent No.: US 10,367,923 B2
(45) Date of Patent: Jul. 30, 2019

(54) METHOD FOR PROCESSING A DATA PACKET

(71) Applicant: Robert Bosch GmbH, Stuttgart (DE)

(72) Inventors: Volker Blaschke, Ludwigsburg (DE); Guenter Vogel, Reutlingen (DE); Timo Lothspeich, Gerlingen (DE); Anton Pfefferseder, Sauerlach (DE); Reiner Schnitzer, Reutlingen (DE); Jeffrey Lee, Summit, NJ (US); Soeren Krieger, Reutlingen (DE); Juergen Mallok, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 212 days.

(21) Appl. No.: 14/353,205

(22) PCT Filed: Oct. 2, 2012

(86) PCT No.: PCT/EP2012/069407
§ 371 (c)(1),
(2) Date: Apr. 21, 2014

(87) PCT Pub. No.: WO2013/056976
PCT Pub. Date: Apr. 25, 2013

(65) Prior Publication Data
US 2014/0247837 A1 Sep. 4, 2014

(30) Foreign Application Priority Data
Oct. 19, 2011 (DE) .................. 10 2011 084 740

(51) Int. Cl.
*H04L 29/06* (2006.01)
*H04L 12/413* (2006.01)

(52) U.S. Cl.
CPC ............ *H04L 69/22* (2013.01); *H04L 12/413* (2013.01); *H04L 69/14* (2013.01); *H04L 69/26* (2013.01); *Y02D 50/30* (2018.01)

(58) Field of Classification Search
CPC ............ H04L 1/0072; H04L 12/40032; H04L 25/03343; H04L 25/4975; H04L 49/90;
(Continued)

(56) References Cited

U.S. PATENT DOCUMENTS 6,044,445 A * 3/2000 Tsuda .................. G06F 12/1081 711/152
6,988,236 B2 * 1/2006 Ptasinski ............... H04L 1/0003 370/252

(Continued)

FOREIGN PATENT DOCUMENTS

WO 2010/005775 1/2010

OTHER PUBLICATIONS

International Search Report for Application No. PCT/EP2012/069407 dated Jan. 7, 2013 (2 pages).

*Primary Examiner* — Khoa Huynh
(74) *Attorney, Agent, or Firm* — Michael Best & Friedrich LLP

(57) ABSTRACT

The invention relates to a method for processing at least one data packet (78, 156) which comprises a first header (82, 158) and a payload (100, 160), wherein the first header (82, 158) is processed by a first mode and the payload (100, 160) is processed by a second mode, wherein a number of processing steps (172, 174) for carrying out the second mode is greater than a number of processing steps (168, 170) for carrying out the first mode, the two modes being performed separately from one another.

12 Claims, 4 Drawing Sheets

(58) Field of Classification Search
CPC ..... H04L 69/323; H04L 12/413; H04L 69/14; H04L 69/22; H04L 69/26; Y02D 50/00; Y02D 50/30; Y02D 50/40
USPC .......................................................... 370/475
See application file for complete search history.

(56) References Cited

U.S. PATENT DOCUMENTS

| | | | |
|---|---|---|---|
| 8,614,961 B1* | 12/2013 | Katar | H04L 12/2838 370/252 |
| 2003/0138253 A1* | 7/2003 | Kim | H04J 14/0227 398/69 |
| 2003/0174677 A1* | 9/2003 | Mantha | H04L 1/0007 370/335 |
| 2004/0015717 A1* | 1/2004 | Colas | H04L 29/06 726/13 |
| 2005/0259678 A1* | 11/2005 | Gaur | H04L 63/145 370/463 |
| 2006/0209889 A1* | 9/2006 | Tamai | H04L 47/10 370/468 |
| 2006/0215590 A1* | 9/2006 | Sharma | H04H 20/42 370/311 |
| 2007/0133586 A1* | 6/2007 | Ojard | H04L 1/0072 370/421 |
| 2008/0045272 A1* | 2/2008 | Wang | H04L 12/5695 455/561 |
| 2008/0304432 A1* | 12/2008 | Lee | H04W 52/029 370/311 |
| 2010/0150043 A1* | 6/2010 | Kim | H04W 52/0235 370/311 |
| 2011/0197105 A1* | 8/2011 | Murakami | H03M 13/116 714/752 |
| 2011/0242088 A1* | 10/2011 | Kim | G09G 3/3611 345/214 |

* cited by examiner

METHOD FOR PROCESSING A DATA PACKET

BACKGROUND OF THE INVENTION

The invention relates to a method for processing a data packet and a network node.

In the packet-oriented transmission of items of information, the information data or application data to be transmitted are transmitted within a data packet as so-called user data, which are required for the control of the exchange of information. In addition, the data packet comprises a so-called header which additionally comprises items of control information. The data packet, which consists of a combination of the so-called payload, which comprises the user data, and the header, is normally transmitted as a unit via a communication network.

As a rule, a series of complex and energy intensive signal processing steps are necessary for the processing of the data packet in a network node embodied as a receiver before the information transmitted is available for further processing in the data link layer. Only then can an evaluation of the information of the header as well as the information available as user data in the payload be carried out.

In addition, the evaluation of the destination address of a received data packet is provided at the level of the data link layer or, respectively, destination MAC in an Ethernet header, wherein a decision is made as to whether the entire packet is to be evaluated and further processed at all. In conventional procedural approaches, this means that each network node has to process the received data packet in the physical layer before the evaluation of the receiver address can subsequently take place and a decision about the further processing of the payload data can be made. This involves all network nodes which receive the data packet carrying out a complex signal processing which however only needs to be performed by the at least one network node designed as a receiver, i.e. a network node in a unicast transmission or a plurality of network nodes in a multicast transmission, and to which the data packet is actually directed. In the event that all other network nodes likewise process the data package, this leads to an unnecessarily high energy consumption.

SUMMARY OF THE INVENTION

The invention allows for a processing of a data packet comprising a header, which can be denoted as a first header in relation to a conceivable second header, and a payload (user data). In this context, the first header and the payload are structured differently so that the algorithms for processing and evaluating the first header and the payload on the physical layer comprise a different number of processing steps and/or arithmetic operations and therefore different levels of complexity.

In order to process the data packet, different modes, which are normally separate from one another and can be carried out separately, are used for the first header and the payload. The processing of said components of the data packet can comprise different measures. In so doing, a transmission mode for the header and a transmission mode for the payload can be used as modes in a first measure for transmitting and therefore for transferring the data packet between network nodes of a network. As a result, the header, normally a first header, can be transmitted analogously and the payload digitally when designing the invention.

The same is true for a reception of the data packet by means of a network node as a further measure, wherein a reception mode for the header and a reception mode for the payload are used as modes. When designing the invention, data is received analogously by the header and digitally by the payload. To this end, the network node can have different regions, wherein a processing and thus also a reception by the header is performed according to a (e.g. analog) mode provided for the header in a first region, and a processing and thus also a reception by the payload is performed according to a (e.g. digital) mode provided for the payload in a second region.

Other measures may also be possible for processing the data packet, wherein in each case a mode is used for the header, which is separate from the mode for the payload. As a further conceivable measure when sending the data packet, the header can, e.g., be sent with a first, e.g. analog, send mode for the header and the payload from the same network node with a second, e.g. digital, send mode for the payload.

In order to carry out the second mode and thus also a second transmission, send, reception and/or processing mode, a larger number of processing steps or arithmetic operations are normally required than for the first mode, e.g. the first transmission, send, reception and/or processing mode. When designing the invention, the first mode requires a processing step. The second mode requires at least one processing step, e.g. at least one arithmetic operation, more than the first mode.

In one embodiment of the method according to the invention, the measure, which provides for transmitting the information of a header of a data packet with a significantly simpler transmission mode than the actual user data in the payload of the data packet, can result in among other things the energy requirement, which is needed to ascertain a destination address and thus a receiver address in the data packet, being reduced in a network node. The method can, for example, be used for a communication system which is designed as a network and has a very sophisticated physical signal processing system and strict layer separation and thus a separation of layers corresponding to the ISO/OSI layer model.

Within the scope of the invention, two different transmission modes and thus different modes for transferring the data and/or information of a header as well as of a payload of a data packet can be used for packet-switched networks that are designed for communication. The two different transmission modes and thus communication modes for transmitting the header on the one hand and the payload on the other hand require to varying degrees many processing steps or arithmetic operations and have different levels of complexity. Hence, an analog communication mode for the header comprises fewer processing steps than a digital communication mode which is provided for the payload.

The amount of the data within the header of the data packet is normally lower by several orders of magnitude than the amount of the data of the payload of the data packet. In order to achieve a correspondingly good performance, i.e. a high data rate and low error rate, when transmitting the data of the payload, complex transmission modes or technologies are used. As a result, the possible throughput of data increases but the complexity and expense for the signal processing in the physical layer of the receiving network node increase at the same time and therefore also the energy requirement of the individual network nodes.

This complexity is however not absolutely necessary for the decision whether the actual data packet is addressed to the respective network node. For that reason, a significantly more simple transmission mode can be used for the transmission of the information of the header than is the case for the payload. In so doing, the complexity and expense for the signal processing for the address evaluation is reduced in each network node. Only the network node which sends the data packet and at least one receiving network node, to which the data packet is directed, utilize respectively the complex signal processing path while using the second mode. All other network nodes remain in contrast in the first mode of reduced complexity. In so doing, a considerable reduction in the energy requirement for the network as a total system can be achieved.

In the embodiment of the method described here, a first transmission mode is used for transmitting the information of the header, which mode comprises a significantly fewer number of processing steps than a second transmission mode that is separate from said first transmission mode and is used for transmitting the payload. The transmission mode for the header can, e.g., consist of an amplitude modulation. In order to receive and evaluate this so-called low complexity header and thus a header having a lower level of complexity than components of a data packet, a significantly reduced complexity of the signal processing system is required in the receiving network node, whereby a total saving of energy results.

In order to implement the method, separate regions having different reception paths for different components of a data packet are provided in a network node designed as a receiver in one embodiment of the invention. Said separate regions can be activated or deactivated in each case independently of one another. A network node can accordingly comprise a first region having a first reception path for headers (header reception path), a second region having a second reception path for payloads (payload reception path) and if necessary also at least one further reception path for at least one further component of a data packet. In addition, a suitable interconnection is provided between the at least two reception paths that are independent of one another; thus enabling an activation of the complex reception path, normally the payload reception path, to be achieved by means of a simple reception path, normally the header reception path, via an item of wake-up information.

It is furthermore possible to use a single reception path which however can be operated in different modes, namely in a first mode (header mode) with low bandwidth and low energy consumption for processing the header of the data packet and in a second mode (payload mode) with higher bandwidth and thus also with high energy consumption for processing the payload of the data packet. In order to implement this embodiment of the invention, it is conceivable that an analog to digital converter is used as a component of a network node when processing, e.g., different sampling rates, i.e. a header sampling rate for a header and a payload sampling rate for a payload of the data packet.

The low complexity header described above can furthermore be expanded to the extent that even short control data sequences in the MAC layer are transmitted exclusively as a low complexity sequence. As long as this transmission does not require more time than is the case when using the complex transmission mode, a further potential source for energy saving exists.

Depending on the embodiment of the invention, a combination of the low complexity header described here and the traditional packet design of a data packet can furthermore be used. In addition, a mixed operation using the traditional approach and the low complexity header is conceivable. In this case, a suitable additional signaling is provided, for example, for identifying transmitted data packets and/or procedural approaches for transmitting data packets in order to ensure the coexistence and compatibility of both procedural approaches.

The network node according to the invention is designed to carry out all of the steps of the disclosed method. In so doing, individual steps of said method can also be carried out by individual components of the network node. In addition, functions of the network node or functions of individual components of the network node can be implemented as steps of said method. It is furthermore possible that steps of the method are realized as functions of at least one component of the network node or of the network node.

Further advantages and embodiments of the invention ensue from the description and the attached drawings.

It goes without saying that the features previously mentioned and those yet to be explained below cannot only be used in the respectively specified combination but also in other combinations or solely by themselves without departing from the scope of the present invention.

DETAILED DESCRIPTION

Figure 1:
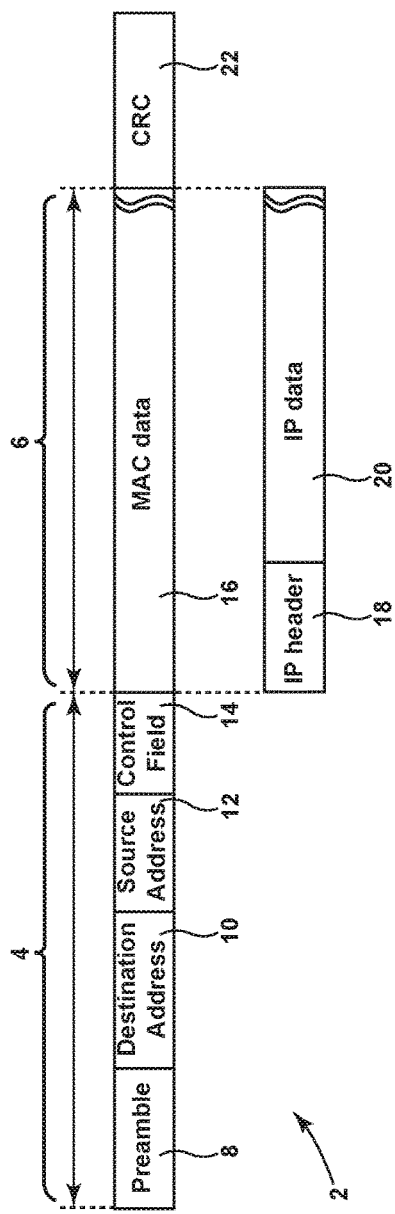
FIG. 1 shows an example for a data packet in schematic depiction.

The invention is schematically depicted in the drawings on the basis of exemplary embodiments and is described below in detail with reference to the drawings.

The figures are described in a coherent and comprehensive manner. Identical reference numerals denote identical components.

FIG. 1 shows schematically an example for a layout of a frame of a data packet 2, as said data packet is normally used in a network designed as an Ethernet/IP network using the internet protocol (IP) for transmitting data. In the case of a packet-oriented transmission, the internet protocol is used as a standard protocol for the networking of institutions.

This data packet 2 comprises a data header denoted as header 4 as well as a payload 6 on a network and data link layer for an IP communication via Ethernet. In so doing, the header 4 comprises a first field with a preamble 8 as an introduction, a second field having at least one destination address 10 as receiver address, a third field having a source address 12 as well as a control field 14 (contr.). The user data 16 of the payload 6 can also be denoted as so-called MAC data having a MAC address or media access control address. It can be seen with the aid of the depiction that the entire frame of the IP layer is included as payload 6 in the frame of the underlying MAC layer. In the IP layer, the user data 16 are divided into an IP header 18, i.e. a data header according to the internet protocol, and IP data 20. Furthermore, the data packet 2 comprises a field for a cyclical redundancy check 22 (CRC).

In the sense of the ISO/OSI layer model, the processing of the information occurs on the different layers independently of one another. This means that the header information of the MAC frame is exclusively required for the processing and transmission of the data packet on the MAC level. The information, i.e. the IP header 18 and the IP data 20, in the IP frame are encapsulated in the MAC frame within the user data 16.

The field comprising the destination address 10 is an essential constituent part within the header 4 of the MAC layer. As destination address 10, said field contains the address of at least one network node provided as destination and therefore as receiver, to which the data packet 2 is intended to be transmitted.

If the data packet 2 is transmitted via a network designed as a communication network, all network nodes, as connected participants, receive said data packet 2 and evaluate the field comprising the at least one destination address 10. If the destination address 10 contained therein corresponds to that of the individual network node, the data packet 2 is further processed. If there is not a match, the data packet 2 received is discarded.

Depending on the transmission technology being used, this procedural approach has the effect on the physical level that the entire signal processing has to have been already completed in the physical layer at least for the destination address 10 before a decision can be reached about the actual necessity for receiving the data packet 2.

Known switching nodes within a network, such as, e.g., Ethernet switches, already evaluate the destination address while said address is being received. As a result, it is possible to keep the delay time produced by a switch to a minimum. The data packet 2 is already further transmitted from the port (terminal) via which the network node that is intended as the receiver can be reached before said data packet has completely arrived in the switch.

Figure 2:
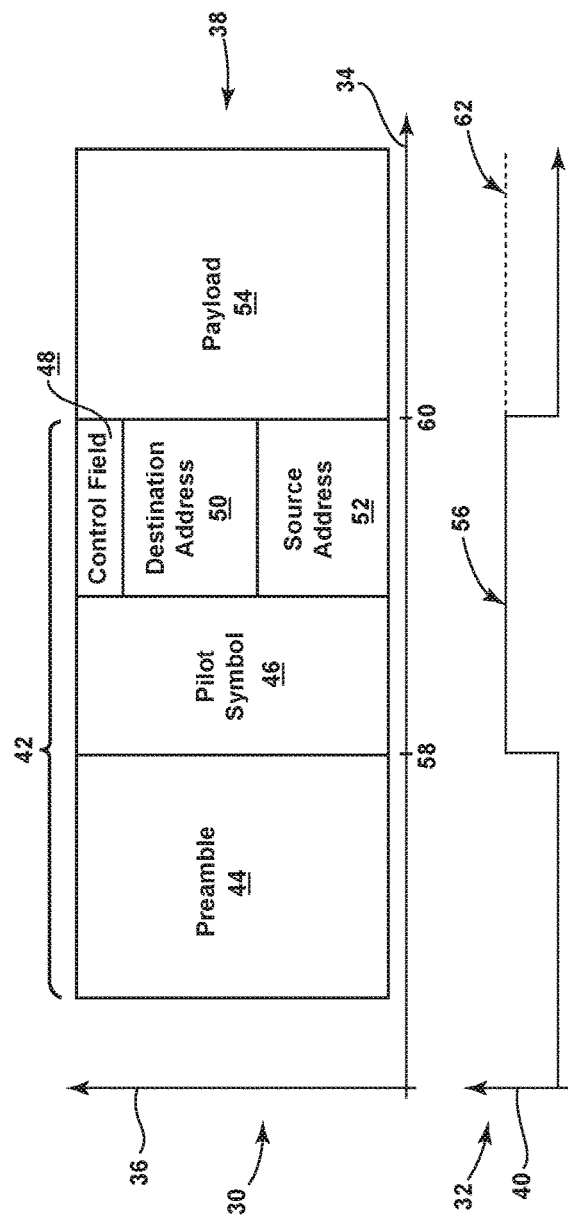
FIG. 2 shows diagrams of an example for transmitting a data packet disclosed by the prior art.

The two diagrams 30, 32 from FIG. 2 comprise a time axis as abscissa 34. A measure for a signal processing effort of a network node within a network is plotted along an ordinate 36 of the first diagram 30, said network node receiving a data packet 38 as is used in the prior art. A measure for the energy expenditure of the receiving network node as well as of all further network nodes of the network is plotted along an ordinate 40 of the second diagram 32.

The data packet 38 that is sent and is to be received by only one network node comprises a conventional header 42 having a high level of complexity which in turn includes a field comprising a preamble 44, a field comprising a pilot symbol 46, a control field 48, a field comprising a destination address 50 and a field comprising a source address 52. In addition, the data packet 38 includes a payload 54 which comprises the user data to be transmitted.

It can be seen with the aid of a solid line 56 within the second diagram 32 that all of the network nodes of the network receive the entire header 42 and also process the field comprising the pilot symbol 46, the control field 48 as well as the fields comprising the destination address 50 and the source address 52. In this case, all of the network nodes are active between a first point in time 58 and a second point in time 60, wherein an energy intake results for all network nodes. In so doing, each network node examines whether the data packet 38 received is directed thereto or not by checking the destination address 50.

In the present example, the data packet 38 is only directed to the network node, with which the destination address 50 is associated. Said network node, as the only network node, processes the payload 54 beginning at the second point in time 60 and is active in the meantime, wherein an energy intake results only for this one network node, which is illustrated in the second diagram 32 as a dotted line 62.

Depending on the respective boundary conditions (data rate, tolerance to errors, etc.), of a network, more complex technologies for communication are employed in which signal processing increases in complexity in a sending network node and a receiving network node. Depending on the technology used, a complex signal processing is therefore already required for receiving and evaluating data from the header. This approach is particularly problematic in the environment of embedded network nodes for communication because only a limited energy intake is possible here. A system having the least amount of complexity for the evaluation of the at least one destination address by at least one receiving network node is therefore desirable.

In one possible embodiment of a method according to the invention for processing a data packet which comprises a first header (data packet header) and a payload (user data), the first header is processed by or with a first mode and the payload by or with a second mode, i.e. the header which is normally first and the payload can be processed separately, i.e. sent, transmitted an/or received.

The second mode requires a greater number of processing steps or arithmetic operations than the first mode. The first mode is therefore less complex than the second mode. The two modes are executed separately of one another. The two modes differ from one another, for example, by different modulation methods. Alternatively or additionally, the first mode for the first header can comprise analog processing methods and the second mode for the payload and if applicable the second header digital processing methods.

The possible embodiment of the method according to the invention differs from the known procedural approach by virtue of the fact that, after the destination address has been received, the unaffected network nodes are normally no longer active and at least one affected network node sets a reception path or reception module to a complete reception bandwidth and the required energy is spent to receive the data packet.

Figure 3:
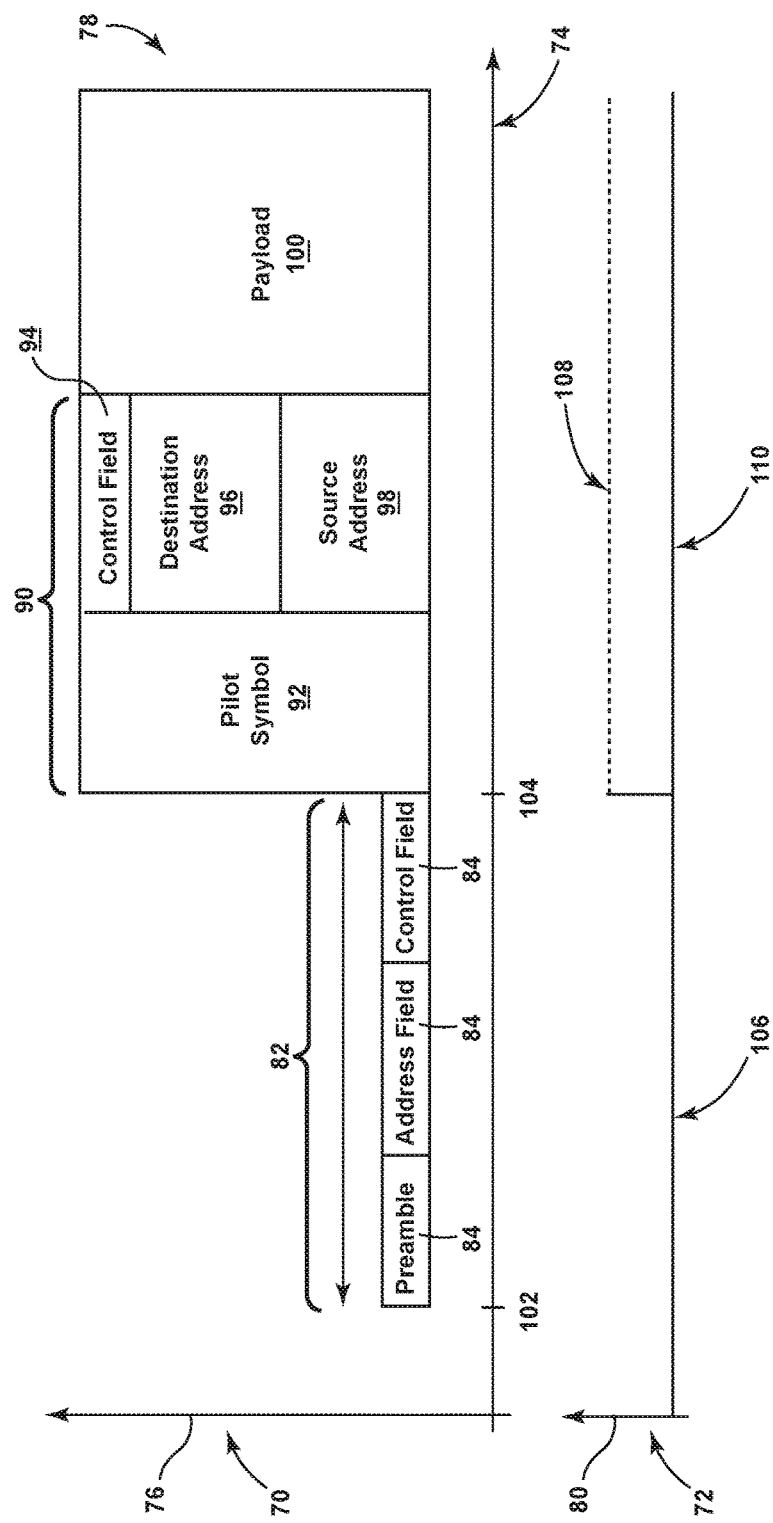
FIG. 3 shows diagrams with regard to an embodiment of the method according to the invention.

The two diagrams 70, 72 from FIG. 3 pertaining to an embodiment of the method according to the invention likewise comprise a time axis as abscissa 74. The first diagram 70 depicted at the top comprises an ordinate 76 along which a measure for a signal processing effort of a network node within a network is plotted, said network node receiving a transmitted data packet 78 in one embodiment of the invention. A measure for an energy expenditure of the receiving network node and also all of the network nodes of the network is plotted along an ordinate 80 of the second diagram 72.

The data packet 78 used in the embodiment of the invention comprises a first slender header 82 having a low level of complexity. Said first header 82 having a low level of complexity includes a field comprising a preamble 84, and address field 86 and a control field 88.

The data packet 78 further comprises a second header 90 having a high level of conventional complexity. Said second header 90 having a high level of complexity includes a field comprising a pilot symbol 92, a control field 94, a field comprising a destination address 96 and a field comprising a source address 98. In addition, the data packet 78 includes a payload 100 comprising user data.

In order to transmit the data packet 78, a first mode designed as a first transmission mode is used for the first header 82 and a second mode designed as a second transmission mode for the payload 100. The second header 90 which is more complex than the first header 82 is processed with the second mode.

Within a period of time which is delimited here by a first point in time 102 and a second point in time 104, each network node of the network receives the first header 82 of the data packet 78 and examines said first header 82 as to whether the data packet 78 is directed thereto, i.e. to the respective network node. In the process, contents of the address field 86 are checked among other things. The address field 86 comprises at least one item of information about at least one destination address which is associated with at least one network node for which the data packet 78 is intended. Because the first header 82 has a low level of complexity, only one small energy intake results for all of the network nodes of the network, as is indicated by the first line 106 up to the second point in time 104. Up until the examination of the first header 82 has been completed, each network node decides whether the data packet is directed thereto or not.

Beginning at the second point in time 104, only that at least one network node processes the second header 90, which has a high level of complexity, as well as the payload 100 of the data packet 78. A high energy intake results here only for the at least one network node, which is indicated in the second diagram 72 by the dashed line 108 which begins at the second point in time. A small energy intake results from the second point in time 104 for all other network nodes, to which the data packet 78 is not directed. This is indicated by the line 110 beginning at the second point in time 104.

Figure 4:
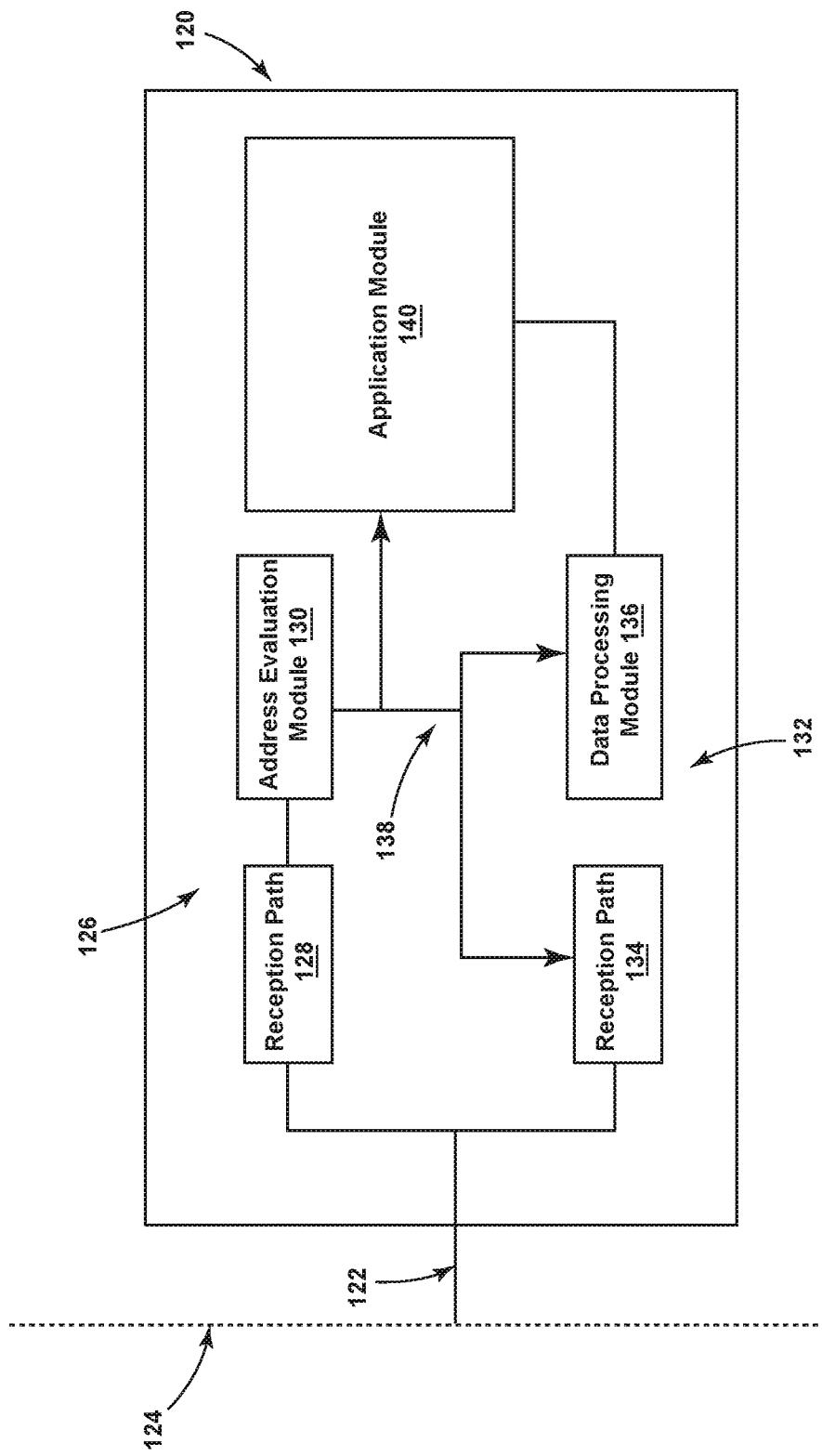
FIG. 4 shows a first embodiment of an inventive network node in schematic depiction.

The first embodiment of the inventive network node 120, which is depicted schematically in FIG. 4, for processing at least one data packet, which comprises a first header having a low level of complexity and a payload having a high level of complexity, is connected via a communication connection 122, which is designed here as a cable, to further network nodes of a network 124 with which the network node 120 shown here is also associated.

Said network node 120 comprises a first region 126 which is designed to process data and/or signals having a low level of complexity and therefore normally to process signals from a header 82 having a low level of complexity, such a header being, e.g., of the kind that the data packet 78 from FIG. 3 comprises. Said first region 126 comprises a reception path 128 for receiving a signal which is designed here as a header 82 having a low level of complexity as well as an address evaluation module 130 for evaluating an address field 86 within the header 82 having a low level of complexity. Said evaluation module 130 also comprises an item of information about a destination address by which item it is defined to which network node 120 the data packet 78 is addressed. As a result, a check is made whether the data packet is directed to the network node 120 or not.

In addition, the network node 120 comprises a second region 132 for evaluating data and/or signals which have a high level of conventional complexity. The second region 132 comprises a reception path 134 for receiving a signal which can be designed here as a second header 90 having a high level of complexity and/or as a payload 100 of the data packet depicted in FIG. 3. The second region 132 further comprises a data processing module 136 which is designed to process data of the second header 90 and/or the user date of the data packet 78. The network node 120 is designed to process the header 82 according to a first mode and the payload 110 according to a second mode, i.e. to send, receive and/or check.

Normally the first region 126 is designed to process the first header 82 according to a first or analog mode and the second region 132 to process the payload according to a second or digital mode. The second mode, which is executed in the second region 132, furthermore requires a larger number of processing steps than the first mode to be executed in the first region 126.

When carrying out the method by means of the embodiment of the network node 120 shown in FIG. 4, at least the first header 82 of the data packet 78 is received via the communication connection 122 at the first point in time 102, as said point in time 102 is indicated in the diagrams from FIG. 3. Irrespective of whether the complete data packet 78 or merely the first header 82 is received, only an examination of the first header 82 takes place beginning at the first point in time 102. Said examination is completed by the second point in time 104, wherein up until then it is decided whether the data packet 78 is directed to the network node 120 or not.

In the event it turns out from information within the first header 82 having a low level of complexity that the data packet 78 is not directed to the network node 120, said data packet 78 is discarded and not processed further.

When examining the first header 82 having a low level of complexity, it however happens to turn out that the data packet 78 is intended for the network node 120 and therefore directed and/or addressed to the same, further components of the data packet 78, i.e. the second header 90 having a high level of complexity as well as the payload 100, are supplied to the second region 132 and therefore to the network node 120 for processing. Said processing can be activated at the second point in time 104 by the address evaluation module 130. To this end, the address evaluation module 130 can provide and thus transmit an item of wake-up information 138 (wake-up) to the reception path 134 and/or the data processing module 136. As a result of the wake-up 138, a reception of the further components of the data packet by means of the reception path 134 and the processing of said further components by means of the data processing module 136 are triggered.

In addition, the network node comprises an application module 140 which is separated from the two previously described regions 126, 132 but to which data of the data packet 78 can be transmitted for further application. This can mean that the components of the first region 126 transmit data of the first header 82 and/or data which are based on the first header 82 to the application module. The components of the second region can transmit data of the second header 90 and/or of the payload 100 as well as data which is based on the second header 90 and/or the payload 100 to the application module 140.

A network 124 via which a data packet is transmitted and/or sent, has as participants normally at least two network nodes 120 according to the invention.

In order to carry out the method, it is furthermore possible to use the ISO/OSI layer model as said model is used for the data packet 2 described with the aid of FIG. 1. A previously described network node 120 according to the invention can be configured as a component of a network 124 which is designed to use Ethernet technology, in which data packets 78 are processed according to the IP protocol and transmitted between network nodes 78. It is furthermore possible to implement the invention in a so-called embedded network, wherein at least one network node and therefore one network is embedded in a technical device, e.g., in a motor vehicle.

The first header 82 previously described differs from the second header 90 and the payload 100 by virtue of the fact that data, e.g. address data in the address field, are transmitted as simple bit-stream. The individual data bits of said data are directly transmitted using a suitable analog or digital transmission method having a low level of complexity, e.g. amplitude modulation, frequency modulation or phase modulation, and a low number of steps.

The data of the second header 90 and the payload 100 are in contrast transmitted by means of a high-order digital modulation method, e.g. quadrature amplitude modulation.

The first header 82 further differs from the second header 90 and/or the payload 100 by virtue of the fact that the bandwidth used by the first header 82 is significantly smaller in the frequency spectrum than the bandwidth used in the second header 90 and/or in the payload 100.

The result, which comes from the aforementioned characteristics, for the reception and the evaluation of the different regions of the data packet 78, i.e. of the first header 82 as well as of the second header 90 and of the payload 100, is that the complexity of the hardware, such as, e.g., the required analog-digital converters, as well as the complexity of the evaluation algorithms is considerably less for the first header 82 than is the case for the second header 90 and the payload 100.

One configuration of the invention comprises the use of an analog transmission method for the first header 82. In this case, the evaluation of the first header 82 takes place exclusively analogously, whereas a digitalization of the reception signal is provided for the evaluation of the second header 90 and the payload 100, for which a digital transmission method is used.

For a network node, this can mean that, in the aforementioned case, a purely analog first reception path comprising corresponding analog evaluation logic is provided for the first header 82 and a digital reception path comprising corresponding digital signal processing is provided for the second header 90 and the payload 100, wherein the analog reception path 128 is characterized by a significantly lower level of complexity and a significantly lower energy consumption in comparison to the digital second reception path 134.

When configuring the invention, the first header 82 is processed by an analog mode. The payload 100 as well as the second header 90, provided provision is made for said second header, is processed by means of a digital mode. When implementing the method, it can be seen among other things that the level of complexity for evaluating the first header 82 is significantly lower in comparison to the evaluation of the payload 100.

Figure 5:
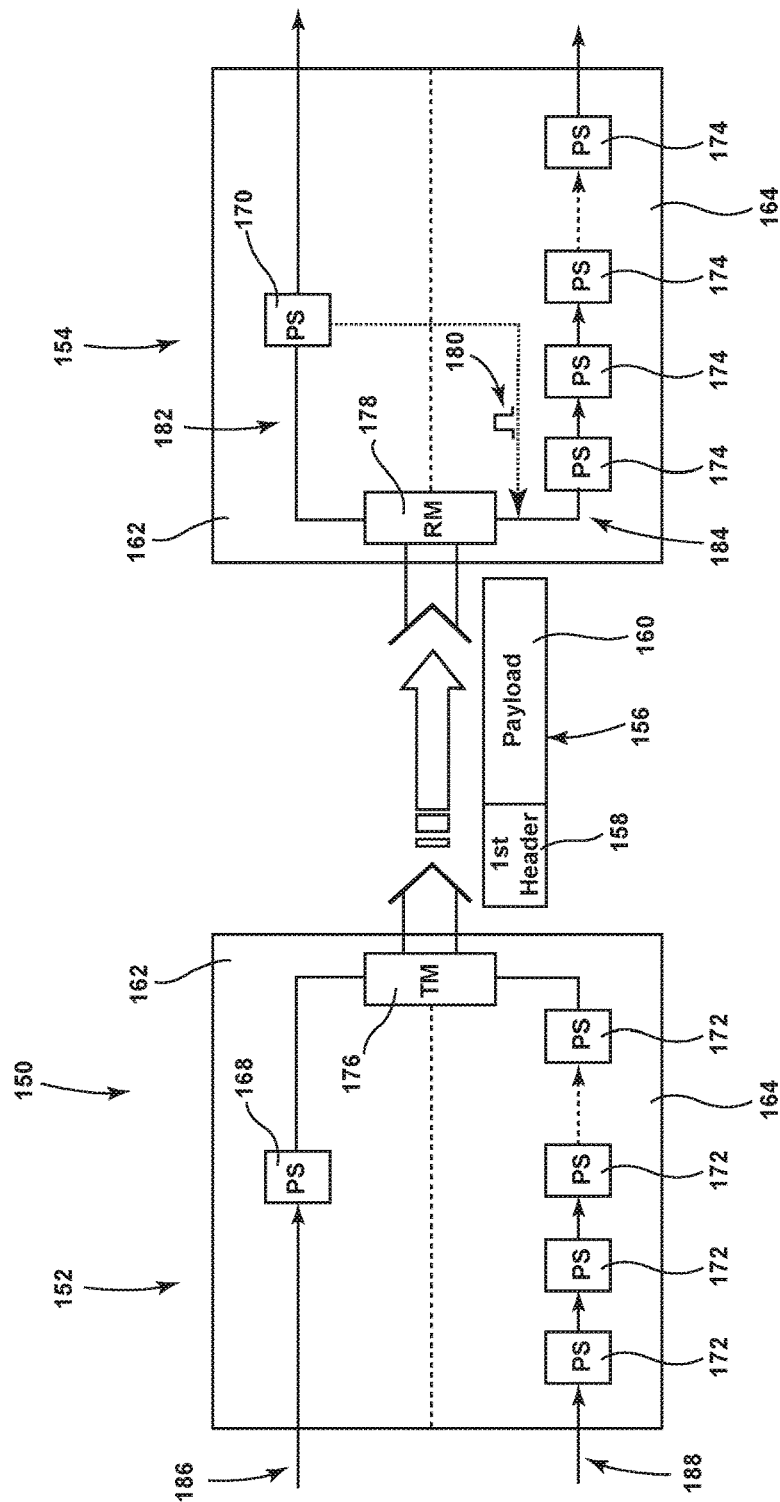
FIG. 5 shows examples for second embodiments of the inventive network nodes in schematic depiction.

FIG. 5 shows a schematic depiction of a further example for a network 150 which comprises further embodiments of network nodes 152, 154 according to the invention. Provision is made in a further embodiment of the method according to the invention, which is intended to be described with the aid of FIG. 5, for a first network node 152 to be designed to send a data packet 156. A second network node 154 is designed to receive said data packet 156. In so doing, the data packet 156 comprises a first header 158, which is to be processed by a first mode. In addition, the data packet 156 comprises a payload 160 which if need be can be enhanced by a second header. In contrast to the first header 158, said payload 160 as well the possible second header is to be processed by a second mode which has a higher level of complexity than the first mode.

Both of the network nodes 152, 154 shown here comprise a first region 162 for processing of the first header 158 by carrying out the first mode as well as a second region 164 for processing the payload 160 and if need be the second header by carrying out the second mode. Provision is thereby made in the present embodiment of the invention for only one processing step (PS) 168 to be required in the first region 162 of the first network node 154 for processing the first header 158 with the first mode as well as one processing step (PS) 170 in the first region 162 of the second network node 154. In order to process the payload 160 as well as if need be the second header by means of the second mode, a plurality of processing steps (PS) 172 is respectively required in the second region 164 of the first network node 152 and likewise a plurality of processing steps (PS) 174 is required in the second region 164 of the second network node 154. Hence, the number of processing steps 172, 174 for carrying out the second mode is greater than the number of processing steps 168, 170 for carrying out the first mode.

Besides the one processing step 168 in the first region 162 for processing the first header with the first mode and the plurality of processing steps 172 in the second region 164, which is designed to process the payload 160, the first network node 152 comprises a transmitter module (TM) 176 for sending the data packet 156. Besides the first region 162 for carrying out the one processing step 170 according to the first mode and the second region 164 comprising the plurality of processing steps 174 according to the second mode, the second network node has a reception module (RM) 178 for receiving the data packet 156 and a component for providing a wake-up 180. In addition, the second network node 154 comprises a first reception path 182 for the first header 158 as well as a second reception path 184 for the payload 160 and if applicable the second header.

It is however also possible that the first network node 152 is likewise designed to receive data packets 156 and in accordance with the depiction show in FIG. 5 likewise comprises a reception module 178, reception paths 182, 184 for a first header 158 and a payload 160 that are separate from one another as well as a component for providing a wake-up 180. The second network node 150 can be accordingly designed to also send data packets 156 and likewise comprise a transmitter module 176.

When implementing the method according to the invention, provision is made for data 186 for the first header 158 to be provided to the first network node 152 and to be processed by a processing step 168. Data 188 for providing the payload 160 are in contrast processed by a plurality of processing steps 172. The simply processed data 186 for the first header as well as the multiply processed data 188 for the payload 160 are linked to the data packet, transmitted from the transmitter module 176 of the first network node 172 and received by the reception module 178 of the second network node 154. Provision is thereby made in the embodiment of the method according to the invention, which was described above, for only the first header 158 of the data packet 156 received to be initially supplied via the first reception path 182 to the one processing step 170 in the first region 162 for the first mode and to be simply processed.

A check is further performed as to whether data 188 of the data packet 156, normally data of the payload 160 of the data packet 156, are intended for the second network node 154, which is depicted here and has received the data packet 156, or not, which takes place by checking an addressing of the data packet 156 which is specified in the first header 158.

In the event that the data 188 of the payload 160 are intended for the second network node 154, the wake-up 180 is activated while carrying out the one processing step 170 in accordance with the first mode and is supplied to a component of the second region 164, whereby the second reception path 184 as a component of the second region 164 is opened for the payload 160 of the data packet 156 and a reception of the payload 160 is triggered. Only if this condition is met, is the payload 160 supplied via the second reception path 184 to the plurality of processing steps 174 in the second region 164 of the second network node 154 and multiply processed. After the payload 160 has been processed by means of the plurality of processing steps 174 in accordance with the second mode, items of information collected in the process can be passed on for further use.

In the event that a check of the first header 158 in the first region 162 by the one processing step 170 in accordance with the first mode comes to the result that the payload 160 is not intended for the second network node 154, the wake-up 180 is not activated. Hence, the payload is not processed by the processing module 174 in accordance with the second mode, whereby among other things energy can be conserved.

The invention claimed is:

1. Method for processing at least one data packet comprising a first header, a second header, which has a higher complexity than the first header, and a payload, comprising:
   transmitting the first header of the data packet in a first transmission mode having a reduced energy requirement necessary for ascertaining a receiver address,
   transmitting the second header and the payload of the data packet in a second transmission mode,
   processing the first header by a first analog mode, and
   processing the second header and the payload by a second, digital mode,
   wherein a number of processing steps for performing the second digital mode is greater than a number of processing steps for performing the first analog mode, wherein the two modes are executed separately from one another.

2. The method according to claim 1, in which a number of computation operations for performing the second digital mode is greater than a number of computation operations for performing the first analog mode.

3. The method according to claim 1, including a first reception path for the first header and a second reception path for the second header and the payload.

4. The method according to claim 1, including processing the second header and the payload if the data packet is directed at a network node.

5. The method according to claim 1, including providing wakeup information if the data packet is directed at a network node.

6. The method according to claim 1, including a network node that is embedded in a motor vehicle.

7. The method according to claim 6, the network node including an Ethernet switch.

8. Method for processing at least one data packet comprising a first header, a second header, which has a higher complexity than the first header, and a payload at a network node, comprising:
   transmitting the data packet in a first analog communication mode for the first header,
   transmitting the second header and the payload of the data packet in a second digital communication mode,
   processing the first header by a first analog mode that includes ascertaining a receiver address at a reduced energy requirement,
   providing wakeup information when the receiver address is ascertained for the network node,
   in response to the wakeup information, processing the second header and the payload by a second, digital mode having a number of processing steps that is greater than a number of processing steps for processing the first header in the first analog mode, and
   wherein the two modes are executed separately from one another at the network node.

9. The method according to claim 8, wherein the second header and the payload are not processed unless the wakeup information is provided.

10. The method according to claim 9, wherein the network node is embedded in a motor vehicle.

11. The method according to claim 9, wherein the network node includes an Ethernet switch.

12. The method according to claim 8, wherein the evaluation of the first header takes place exclusively analogously.

* * * * *